UNITED STATES PATENT OFFICE.

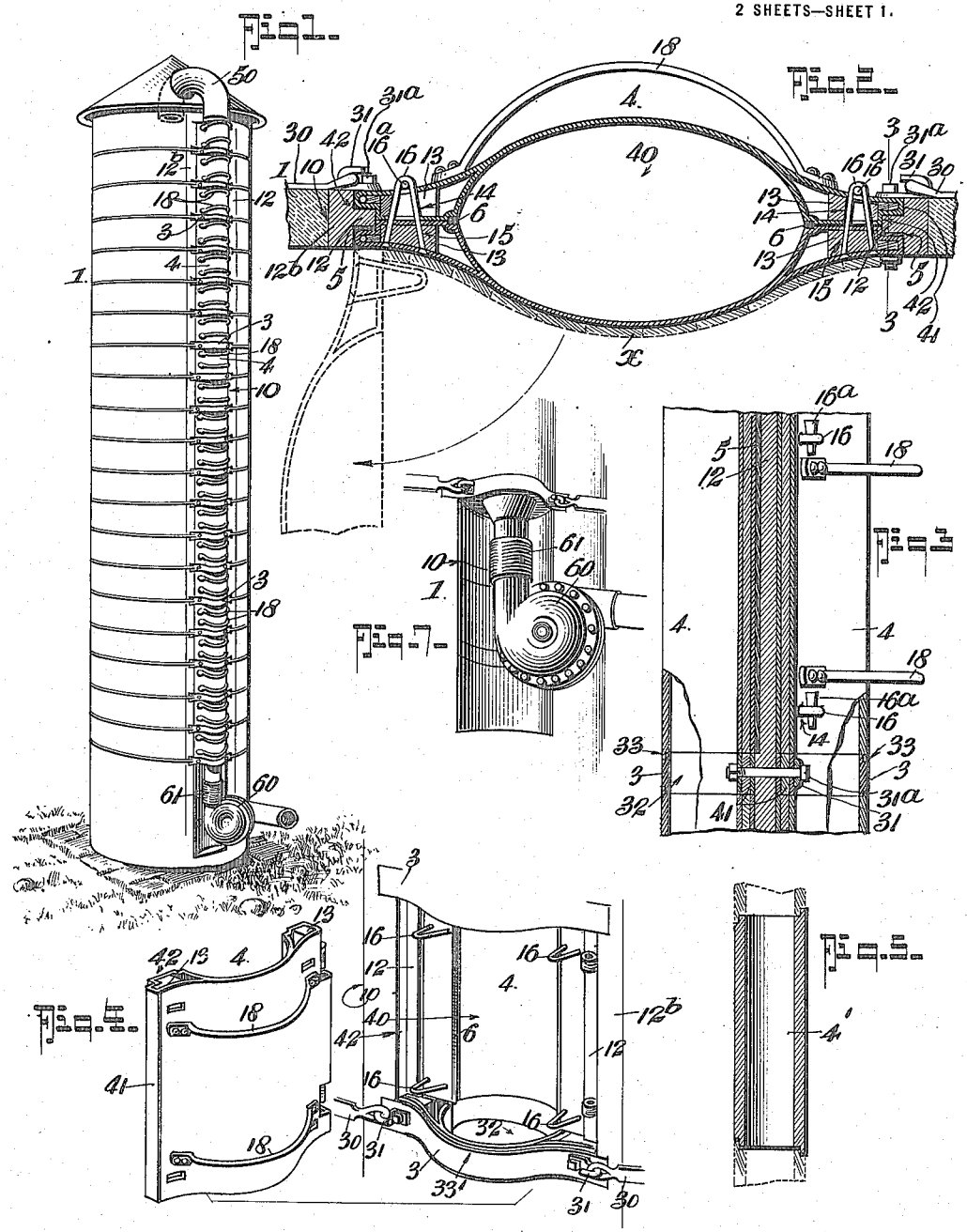

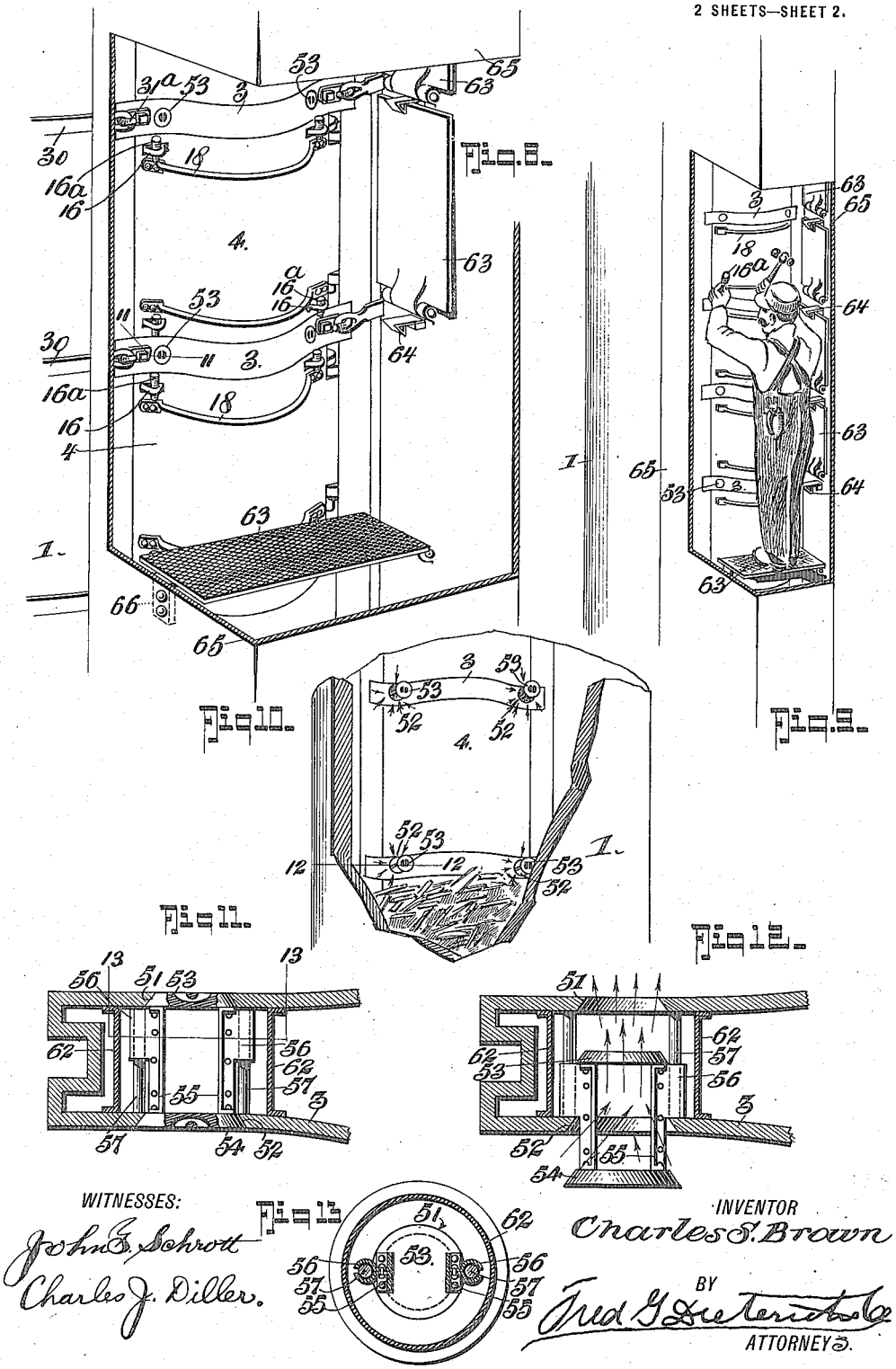

CHARLES S. BROWN, OF RICE, WASHINGTON.

SILO-DOOR.

1,145,550.

Specification of Letters Patent.

Patented July 6, 1915.

Application filed October 29, 1914. Serial No. 869,291.

*To all whom it may concern:*

Be it known that I, CHARLES S. BROWN, residing at Rice, in the county of Stevens and State of Washington, have invented certain new and useful Improvements in Silo-Doors, of which the following is a specification.

This invention has reference to improvements in silos, and it primarily has for its object to provide a new and improved construction of hollow silo door and a system of coöperatively connecting all of the doors to form, as it were, a continuous tube or shaft through which the material for the silo may be pneumatically fed up to and discharged into the silo through the top thereof and in which the several door sections from the topmost one down to the lowermost one may be successively adjusted to allow for feeding out the silage into the tubular tube through which it gravitates to the base of the silo to be collected in a suitable receptacle provided therefor.

With other objects in view that will hereinafter appear, my invention embodies the peculiar construction and novel combination of parts all of which will be hereinafter fully explained, specifically pointed out in the appended claims and illustrated in the accompanying drawings in which:

Figure 1 is a perspective view of a silo that embodies my improvements. Fig. 2 is a horizontal section thereof taken through one of the doors, the two sections that constitute the door being shown closed in full lines, the innermost section thereof being also shown at its swung back or open position in dotted lines. Fig. 3 is a vertical section taken on the line 3—3 of Fig. 2 of a portion of one of the doors. Fig. 4 is a perspective view of one of the doors, the two sections that constitute the same being shown separated. Fig. 5 is a horizontal section of a modified construction of door. Fig. 6 is a cross section that illustrates the form of sill that is used in connection with the modified form of door. Fig. 7 is a detail view of the lower end of the silo and illustrates the blower connection with the tube or shaft. Figs. 8 and 9 are detail views of portions of my silo door and they illustrate a modified arrangement of parts hereinafter specifically referred to. Fig. 10 is a detail view of a portion of the silo body, parts being broken away to illustrate the vent devices in the sills. Fig. 11 is a horizontal section taken on the line 11—11 of Fig. 8 of one of the vent or valve devices, the same being shown in the closed position. Fig. 12 is a similar view of the said devices on the line 12—12 on Fig. 10, the said devices being shown at the open position. Fig. 13 is a cross section of one of the vent valve devices, taken on the line 13—13 on Fig. 11.

In the practical application of my invention, the silo body 1, is of the usual form when built of concrete or tile, and has its doorway or opening 10 extended from the bottom to the top and each of the opposing edges of the said doorway or opening 10 has a flange or cleat 12 that extends the full length thereof, the purpose for which will presently appear.

In my construction of silo the doorway or opening 10 is provided with a system of doors, or in other words, a series of doors, each of which is independent of the others, and each of which is separated from the adjacent doors above and below by a sill 3, the peculiar construction of which and the connection thereof with the door sections will hereinafter be explained.

Each of the doors, in my construction, is in the nature of a double door, the same consisting of two distinct sections 4 each formed from galvanized or other non-corrosive metal, to form a central body 40 convexed in plan view and end portions 41 that engage with flanged edges 42 that bear against the flanges or cleats 12 when the said door sections are at their closed position, as shown in Fig. 2, and to make a practically air-tight joint between the two door sections and between the doorway, packing members 5—6 are arranged on the doorway flanges 12 and between the meeting places of the door sections, as shown in Fig. 2.

To strengthen the ends of the door sections and also to provide for the employment of a simple and economical means for locking the two sections together, filler blocks 13 are located in the said door section ends and the latter, as well as the filler blocks, are suitably apertured as at 14—15 to receive the V-shaped bail 16 secured to the inner door sections and which coöperate with the taper pins 16ª that securely lock the sections together.

One of the ends of each door section is hinged to its adjacent door edge and each of the outer door sections has a pair of attached ladder rungs 18, as shown. The sill members may be likewise provided with rungs and if desired the inner side of the inner door sections may be lined with wood, as indicated by the dotted lines X.

The sills 3, before referred to, and which form the division members between each pair of doors, are detachably held on the silo body in any suitable manner, and when the said silo body is of concrete or tile, the said sills are preferably joined to the cleats of the door frame in a manner best shown in Fig. 3, by reference to which, and to Fig. 4, it will be seen that the said sill members have hooks 31, at the opposite ends that are secured by bolts 31ª which pass through the sill members and the flanges 41. 30 designates bands or hoops that extend around the silo and have their ends shaped to engage with the hooks 31.

When the door is formed of two sections, as shown in Fig. 2, the sill base 3 is also made of two sections that include curved portions to form openings 32 for registering with the tubular door members and to provide for a tight closure of the sill members with the door, when the two sections of the door are closed, each of the sill sections has flanges 33, with which the upper and lower edges of the door sections engage.

When the silo body is of concrete or tile, the cleats 12 may be formed on a separate member 12ᵇ and the latter fastened onto the inner edges of the main or body portion by embedded bolts or otherwise.

In Figs. 5 and 6, I have shown a modified form of door 4′ which has substantially the shape of the double door hereinbefore described, but it is formed of a single body instead of two sections and when this form or modified construction of door is used, the sill shown in Fig. 6 is used, by reference to which it will also be noticed that the inner sill section has upper and lower extended flanges 34 against which the upper and lower edges of the inner door sections abut when closed, and the upper sill sections have shouldered offsets 35 against which the upper and lower sections of the outer door sections close, the upper and lower ends of the said outer door sections being suitably extended to make a proper connection with the outer sill sections, as shown in Fig. 6.

50 designates a supplemental tube that connects with the upper end of the tube or shaft formed by the door sections and which projects down through the top of the silo and 60 designates a blower attached by means of a flexible sleeve 61 to the lower end of the shaft formed by the said door sections.

By reason of the peculiar construction and novel arrangement of the parts as shown and described, when it is desired to fill the silo, the material is pneumatically forced up the shaft or tube built up by the door sections, and discharged down through the top of the silo.

In feeding out the silage, the operator opens the door at the top level of the silage within the silo, to which he can gain ready access by the ladder formed on the outside of the doors and by opening the inner section of the topmost door, the silage can be readily forked into the open shaft or tube through which it gravitates to the bottom into a receptacle provided to receive the same.

To facilitate the delivery of the silage as it is forked into the open shaft, the operator in the silo can close the outer door section which then forms a guard so as to cause the silage to drop down into the chute or shaft.

When the silo is not in use, the upper or supplemental tube is removed and the blower is disconnected and the top and bottom of the shaft are closed by cover members, such arrangement providing, as it were, for a dead air space between the double walls of the doors which serves to protect the silo against frost.

It should be stated that the lower three doors for the silo may be solid (not shown) and correspond in cross section to the inner door of the double door type, to permit for making the required connections between the silo blower and the tubular shaft.

To protect the men in the silo during the operation of filling the silo from dangerous gases that form at the time of filling, I have provided means for the escape of the said gases and so constructed that they may be manipulated either from the outside or the inside of the silo.

By referring now more particularly to Figs. 8 to 12 of the drawings, it will be noticed that the hollow sills are each provided with cross tubes 62, preferably one at each end thereof, that communicate with outer and inner openings 51—52 beveled to form seats for the duplex closure of valve members 53—54 joined by cross members 55, provided with the clamping portions 56 for slidably engaging the guide rods 57, as is best shown in Figs. 11 and 12, by reference to which it will also be noticed that the said portions 56 are of such a length, relatively to the distance between the inner and the outer walls of the hollow sill, so that they form stops for limiting the inner and outer adjustment of the said valve or closure devices.

By providing a closure device arranged and operable as such the same may be readily shifted either from the inside or outside of the silo to the open and closed positions, as shown in Figs. 11 and 12.

In practice the valve or closure devices should be opened just above the silage and closed as soon as the silage reaches the level of the sill.

As an added convenience especially when the silo is to be mounted in freezing weather when the ladder rungs are likely to have become ice-coated, a supplemental or protective chute 65 is built around the doors 4, as shown in Figs. 8 and 9. This chute 65 is provided primarily to facilitate the making of necessary repairs to doors and etc. in inclement weather, and to further this end, steps 63 are hinged at one side of the chute body and held up by suitable spring clips 64. A cleat 66 is also fastened to the chute directly opposite each step so that when the repairman reaches the place where a repair must be made has only to release a hinged step from its clip 64 and allow its free end to rest on a cleat 66 and thus affords a convenient landing on which to stand and from which he cannot fall, he being protected by the chute 65 in which he is working.

While I have not illustrated it, I desire to state that in case of silos that have door frames, the sill members may be made of one member instead of two.

From the foregoing description taken in connection with the accompanying drawing, the complete construction, the manner of operation and the advantages of my invention will be readily understood by those skilled in the art to which the invention relates.

What I claim is:

1. A silo having a doorway formed of a series of hollow door sections and intervening hollow sills, said sections and sills forming a continuous hollow shaft, means for connecting the upper end of the shaft with the upper end of the silo, a blower, and means for connecting the blower with the lower end of the shaft.

2. In a silo, the combination with the silo body having a vertically extended door opening, a closure for the said opening consisting of a series of horizontally disposed hollow door sections and intervening hollow sills, the said sills and door sections being removably held in the doorway, locking means for holding the sills and the door sections in position in the said doorway, said sills and door sections forming a vertically extended hollow shaft, a blower, means for connecting the blower with the lower end of the shaft, and means for connecting the upper end of the shaft with the interior of the silo.

3. In a silo having a door opening extending in the direction of its height; a set of sills extending across the said opening and spaced apart, tubular doors coöperating with the said sills to close the said opening, said sills having apertures for registering with the said tubular doors to form a hollow shaft.

4. A silo having a door opening extending substantially from the top to the bottom, a plurality of sills mounted in the said door opening and spaced apart, each of the said sills having a vertical passageway and a plurality of sets of doors disposed between each adjacent pair of sills, said sets of doors comprising outer and inner door sections of semi-tubular form, whereby when the said sections are closed there will be provided a tubular passage through the doors that register with the sill passages to form a hollow shaft.

5. A silo having a door opening extending substantially from the top to the bottom, a plurality of sills mounted in the said door opening and spaced apart, each of the said sills having a vertical passageway and a plurality of sets of doors disposed between each adjacent pair of sills, said sets of doors comprising outer and inner door sections of semi-tubular form, whereby when the said sections are closed there will be provided a tubular passage through the doors that register with the sill passages to form a hollow shaft, and means for separately mounting the door sections of a set of doors, whereby either or both may be opened at will.

6. A silo having a door opening that extends from the top to the bottom thereof, a series of alternately arranged doors and sills removably mounted upon each other in the opening, means for holding them locked in the said opening, said doors and sills having alining passageways whereby a continuous shaft open at the top and bottom is provided, means connecting the upper end of the shaft with the upper end of the silo, a blower, means for connecting the lower end of the shaft to the blower, said doors and sill members being formed of sections, the door sections having a hinged connection whereby either or both may be swung to the open position.

7. A silo having a door opening extending in the direction of its height; a set of sills extending across the said opening spaced apart, tubular doors coöperating with the said sills to close the said opening, said sills having apertures for registering with the said tubular doors to form a hollow shaft, an air passage that extends transversely through the sill, and means operable from the inside and the outside of the sill for opening and closing the said passage.

8. In a silo having a door opening extending in the direction of its height; a set of sills extending across the said opening and spaced apart, tubular doors coöperating with the sills to close the said opening, said sills having apertures for registering with the said tubular doors to form a hollow shaft, and a means coöperating with each of the said sills for exhausting the gases from within the silo.

9. In a silo having a door opening extending in the direction of its height; a set of sills extending across the said opening and spaced apart, tubular doors coöperating with the said sills to close the said opening, said sills having apertures for registering with said tubular doors to form a hollow shaft, ladder rungs on the outside of each of the said doors; a supplementary chute built around and housing the aforesaid door opening doors and sills, and hinged platforms supportable upon cleats at one side of the chute when at their lowered position, and means in the chute for holding the said platforms to a swung-up position.

CHARLES S. BROWN.

Witnesses:
GUSTAV WEIGELT,
EUGENE E. ATWOOD.